J. A. MOORE.
APPARATUS FOR CONTROLLING AEROPLANES.
APPLICATION FILED DEC. 30, 1910.

1,078,300.

Patented Nov. 11, 1913.

J. A. MOORE.
APPARATUS FOR CONTROLLING AEROPLANES.
APPLICATION FILED DEC. 30, 1910.

1,078,300.

Patented Nov. 11, 1913.

Witnesses
O. B. Baenziger.
Stuart C. Barnes

Inventor
James A. Moore
By Parker & Burton
Attorneys

UNITED STATES PATENT OFFICE.

JAMES A. MOORE, OF DETROIT, MICHIGAN.

APPARATUS FOR CONTROLLING AEROPLANES.

1,078,300.  Specification of Letters Patent.  Patented Nov. 11, 1913.

Application filed December 30, 1910. Serial No. 600,068.

*To all whom it may concern:*

Be it known that I, JAMES A. MOORE, a citizen of the United States, residing at Detroit, county of Wayne, State of Michigan, have invented a certain new and useful Improvement in Apparatus for Controlling Aeroplanes, and declare the following to be a full, clear, and exact description of the same, such as will enable others skilled in the art to which it pertains to make and use the same, reference being had to the accompanying drawings, which form a part of this specification.

My invention relates to an apparatus for maintaining the equilibrium of aeroplanes in flight, and consists in the improvements hereinafter described and pointed out in the claims.

Figure 1:
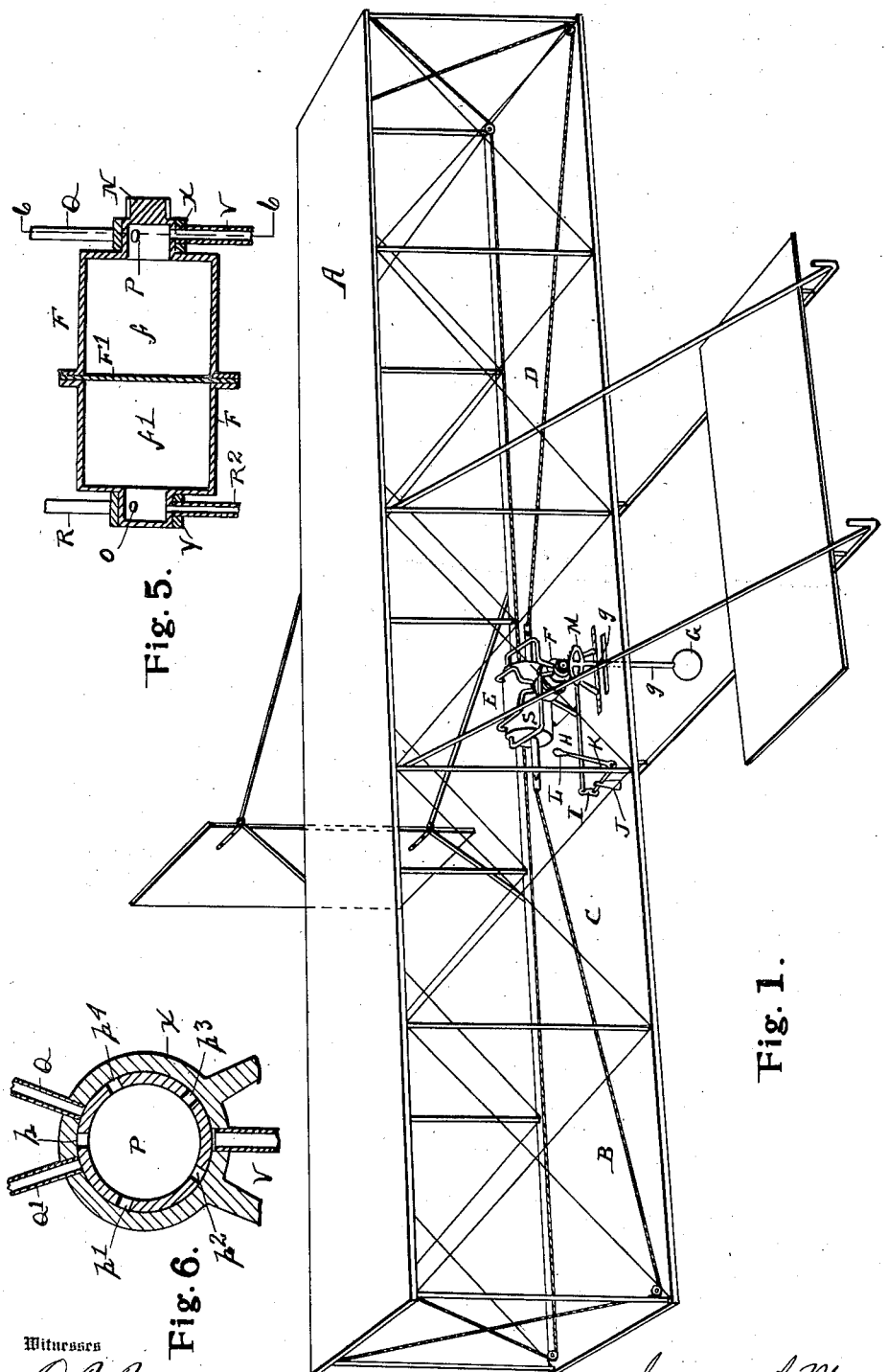
Figure 2:
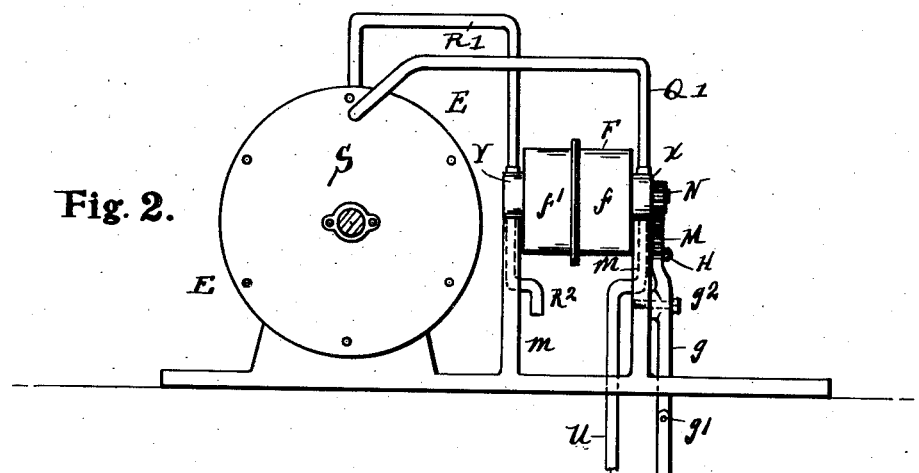
Figure 3:
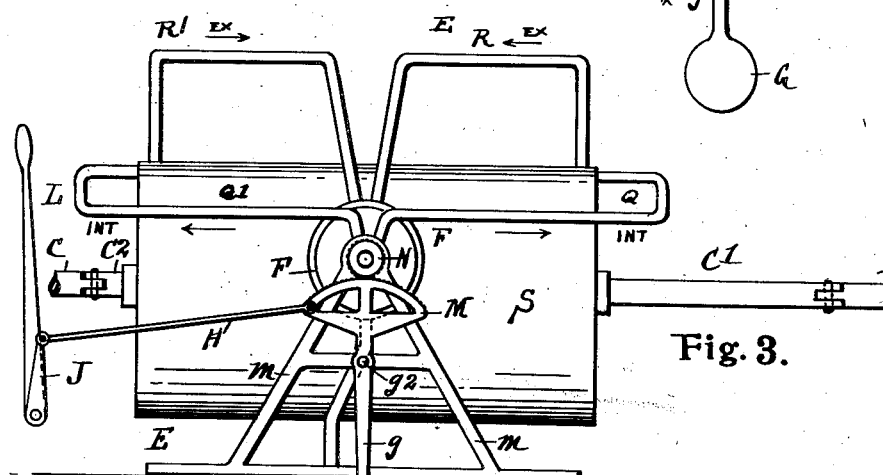
Figure 4:
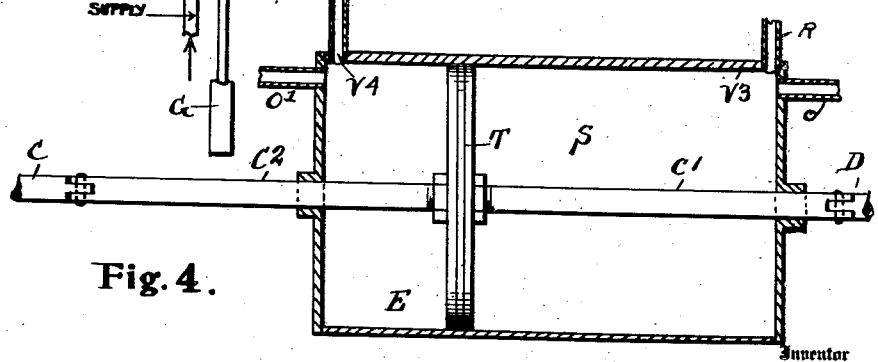

In the accompanying drawings:—Figure 1, is a perspective view of an aeroplane with the apparatus embodying my invention attached thereto. Fig. 2, is an end elevation of such apparatus detached from the apparatus, the piston rod being shown in section. Fig. 3, is a side view of the same. Fig. 4, is a central section of the cylinder shown in Fig. 3. Fig. 5, is a longitudinal section of the controlling valve. Fig. 6, is a section on an enlarged scale taken on the line 6—6 Fig. 5.

For convenience, an aeroplane having the warping apparatus of the "Wright" aeroplane is shown. However, the balancing apparatus may obviously be applied to aeroplanes of different designs.

A and B are the two planes.

C and D are the wires or cords by which the planes are warped to change the level of the plane.

E indicates the apparatus, as a whole, embodying my invention.

S, is a cylinder having a piston T (Fig. 4) therein and piston rods $C^1$, $C^2$, extending in opposite directions from said piston and passing through stuffing boxes at each end of the cylinder S. The wires or cords C and D are secured to the outer ends of the piston rods $C^1$, $C^2$.

F, is a rotating cylinder divided into equal compartments $f$ and $f^1$ by a partition $F^1$ (Fig. 5). The cylinder F has hollow trunnions P, O at its ends, said trunnions being supported in bearings X, Y. Upon a protruding portion of one of said trunnions is secured a gear wheel N.

V, is a pipe leading from a source of supply of compressed air (not shown) which may be a pump or a reservoir carried by the machine.

Q and Q' are pipes leading to opposite ends of the cylinder S.

The trunnion P is hollow and provided with apertures through its wall shown in Fig. 6 and marked P, $P^1$, $P^2$, $P^3$, $P^4$, and these apertures are adapted to connect with the supply pipe V or with the delivery pipes Q or $Q^1$ by passing over and registering with apertures in the walls of the bearing X. Upon the opposite end of the cylinder F is a trunnion O similar to P in every respect except instead of, its bearing Y having apertures accommodating the inlet and delivery pipes, the walls of said bearing are supplied with apertures in which are fitted exhaust pipes R, $R^1$, and pipe $R^2$ which delivers the exhausted air to the atmosphere.

G, is a weight suspended from the lower end of a lever $g$, which lever is pivoted to the frame work $m$ at $g^2$.

M, is a toothed rack on the upper end of the lever $g$, its teeth engaging the teeth of the pinion N.

$g^1$ is a joint in the lever $g$ adapted to permit the weight G to swing freely in a plane vertical to the plane of motion of the lever $g$.

The operation of the above described device is as follows:—The weight G by its gravity, always holds the lever $g$ in a vertical position and the cylinder F is held at such a position when the aeroplane is horizontal that the supply pipe V is halfway between the ports $P^2$ and $P^3$ and the chamber $f$ is closed to the supply of air under pressure. Should the aeroplane tilt to one side the weight G will turn about the pivot $g^2$ relative to the aeroplane and the teeth of the rack M will act on the teeth of the pinion N to rotate the cylinder F and cause the port $P^2$ or $P^3$ to register with the supply pipe V according to the direction in which the aeroplane tips. By the turning of the cylinder, F and one of the apertures $P^2$ or $P^3$ registering with the pipe V the air pressure from said pipe is admitted to the chamber $f$. The compressed air from the chamber $f$ is delivered to one side or the other of the piston T in the cylinder S when a port $P^1$ or $P^4$ registers with the passage to the pipe Q or $Q^1$, moving said piston in one direction or the other and warping the planes by drawing upon the cords C or D to restore the horizontal position of the aeroplane. The air supply should be kept at a uniform pressure, so that as a measured quantity of said air is delivered at each emptying of the chamber $f$ the piston will be moved a definite distance at each action of the apparatus. At this time the trunnion O acts in an analogous way to that described in reference to the trunnion P, to withdraw a definite and equivalent quantity of air from the opposite sides of the piston T to that at which the compressed air from the chamber $f$ has been admitted and discharged the same into the atmosphere. To this end it is desirable that the difference in pressure between the supply reservoir and the cylinder S should be the same as that between said cylinder and the atmosphere. It will be noticed that the chamber $f$ will be alternately filled and partly emptied into one end of the cylinder S as the cylinder F revolves and on being restored to its first position, it will be alternately filled and partly discharged into the other end of the cylinder S to produce a restoration of the piston T to the first position.

The pressure in the pipe V may be about 20 lbs., and that in the cylinder S about 10 pounds.

While the chamber $f$ is being filled and discharged into one end of the cylinder S, the chamber $f^1$ is being filled from the other end of said cylinder and discharged into the atmosphere.

K, (Fig. 1) is a rock shaft having a hand lever L thereon and pivoted in a standard J.

I, is a lever on the rock shaft K connected by rod H with lever $g$ so that said lever may be manipulated to adjust the position of the aeroplane.

The rack M serves to increase the angular motion of the cylinder F due to a given angular motion of the pendulum.

The ports $p$, $p^1$, $p^2$, $p^3$, $p^4$ are equally distributed around the wall of the trunnion P, and the openings to the pipes Q and $Q^1$ are so located that they shall be closed when the opening to the pipe V is open.

What I claim is:—

1. In an aeroplane having means for adjusting its position, a cylinder mounted on said aeroplane, a piston in said cylinder, means for connecting said piston with said adjusting means, a measuring chamber, a source of supply of air under pressure, means for connecting said measuring chamber with the source of air supply and disconnecting the same and with one end or the other of said cylinder when disconnected from the source of air supply, for the purpose described.

2. In an aeroplane having means for adjusting its position, a cylinder mounted on said aeroplane, a piston in said cylinder, means for connecting said piston with said adjusting means, a measuring chamber, a source of supply of air under pressure, means for connecting said measuring chamber with the source of air supply and disconnecting the same and with one end or the other of said cylinder when disconnected from the source of air supply, a second measuring chamber, and means for connecting and disconnecting said second measuring chamber with the opposite end of said cylinder to that to which the first mentioned measuring chamber is connected, and with the outer air when disconnected from said cylinder, for the purpose described.

3. In an aeroplane having means for adjusting its position, a cylinder mounted on said aeroplane, a piston in said cylinder, means for connecting said piston with said adjusting means, a measuring chamber, a source of supply of air under pressure, and means for connecting and disconnecting said measuring chamber with the source of air supply and with one end or the other of said cylinder when disconnected from the source of air supply, a second measuring chamber, and means for connecting and disconnecting said second measuring chamber with the opposite end of said cylinder to that to which the first mentioned measuring chamber is connected, and with the outer air when disconnected from said cylinder, and a weighted lever adapted to control the admission and exit of air to and from said measuring chambers, for the purpose described.

4. In an aeroplane, the combination of means for adjusting the position of said plane, a cylinder, a piston therein, said piston being operatively connected to said adjusting means, a conduit for compressed air leading to said cylinder, a measuring chamber and a valve in said conduit and forming a part thereof, said valve consisting of a rotatable piece having a plurality of peripheral ports, a casing surrounding said piece and forming a part of said conduit, an aperture in said casing communicating with a passage leading to a source of compressed air, two other apertures in said cases communicating with parts of said conduit leading to opposite ends of said cylinder, said ports communicating with said measuring chamber, and adapted to register with said apertures one at a time, the arrangement being such that said measuring chamber shall receive air when one of said ports registers with the aperture communicating with a source of compressed air, and shall deliver air when registering with one of the other apertures.

5. In an aeroplane, the combination of means for adjusting the position of said plane, a cylinder, a piston therein, said piston being operatively connected with said adjusting means, a conduit for compressed air leading to said cylinder, a valve in said conduit and forming a part thereof said valve consisting of a rotatable piece having a measuring chamber therein, a plurality of ports extending through the wall of said chamber, a casing surrounding said piece and forming a part of said conduit and having apertures therein adapted to register with said ports one at a time, and communicating severally with passages leading to the source of compressed air and to the ends of said cylinder, the arrangement being such that said measuring chamber shall receive air when one of said parts registers with the aperture communicating with a source of compressed air and shall deliver air when registering with one of the other apertures.

6. In an aeroplane, the combination of means for adjusting the position of said plane, a cylinder, a piston therein operatively connected to said controlling means, a passage leading to a source of compressed air, a conduit leading to ends of said cylinder, a valve in said conduit consisting of the rotatable piece F, having measuring chambers $f$, $f^1$, therein, said piece being provided with hollow trunnions at its ends opening into the chambers $f$, $f^1$, respectively, a plurality of ports extending through the wall of each of said chambers, a casing surrounding each of said trunnions, one of said casings being provided with apertures adapted to register with said ports, one at a time and communicating one with said passage leading to the source of compressed air and the others of said apertures communicating with passages to the ends of said cylinder, the other of said casings being provided with apertures adapted to register with said ports, one at a time and communicating one with the outer air and the others with the ends of said cylinders, substantially as and for the purpose described.

7. In an aeroplane, the combination of means for adjusting the position of said plane, a cylinder, a piston therein operatively connected to said controlling means, a passage leading to a source of compressed air and a conduit leading to the ends of said cylinder, a valve consisting of the rotatable piece F, having measuring chambers $f$, $f^1$ therein, a plurality of ports extending through the walls of said chamber, said piece being provided with hollow trunnions at its ends opening into the chambers $f$, $f^1$, respectively, a casing surrounding each of said trunnions, one of said casings being provided with apertures adapted to register with said ports, one at a time and communicating with a passage leading to the source of compressed air and the other of said apertures communicating with passages to the ends of said cylinder, the other of said casings being provided with apertures adapted to register with said ports, one at a time and communicating one with the outer air and the others with the ends of said cylinders, and a weighted lever adapted to rotate said piece by its gravity, substantially as and for the purpose described.

In testimony whereof, I sign this specification in the presence of two witnesses.

JAMES A. MOORE.

Witnesses:
VIRGINIA C. SPRATT,
ELLIOTT J. STODDARD.